Figure 1:
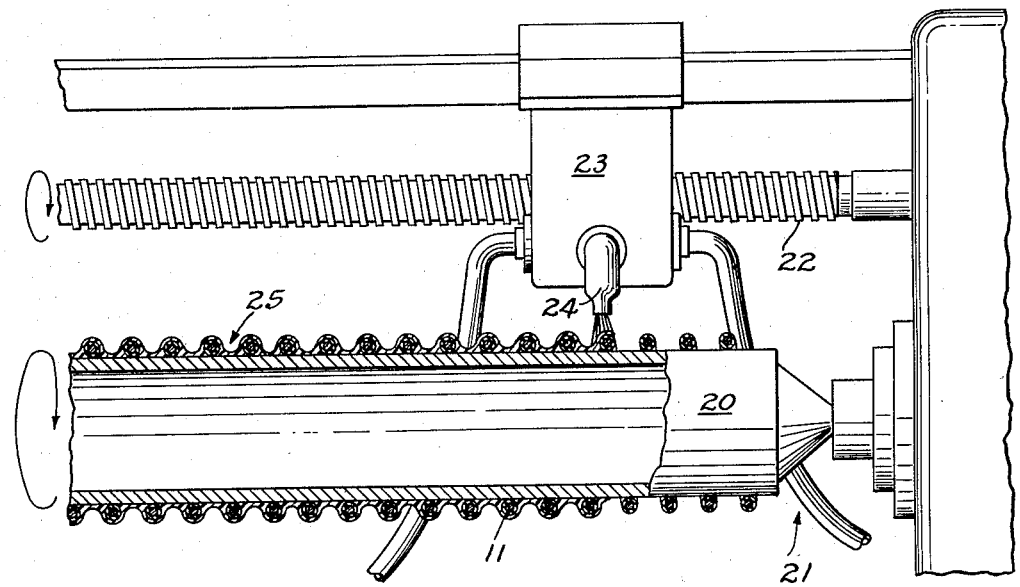

Nov. 11, 1958  J. E. DUFF  2,859,775
FLEXIBLE HOSE
Filed Feb. 2, 1955

United States Patent Office 2,859,775
Patented Nov. 11, 1958

2,859,775
FLEXIBLE HOSE

Jack E. Duff, Canton, Ohio, assignor to The Hoover Company, North Canton, Ohio, a corporation of Ohio Application February 2, 1955, Serial No. 485,674

2 Claims. (Cl. 138—56)

The present invention relates to flexible hose and to the method of making the same and more particularly to a flexible hose adapted for use with a suction cleaner.

According to the present invention, a hose is formed of a thermoplastic material and a cylindrically coiled reinforcing element.

The hose wall, according to the present invention, is formed of a sheathed cylindrically coiled reinforcing element embedded in a wall of thermoplastic material which surrounds and connects the adjacent turns of the sheathed cylindrically coiled reinforcing element. The wire of the sheathed cylindrically coiled reinforcing element is not bonded to its sheath and, therefore, has freedom of movement relative to the wall of the hose as the hose is flexed, thereby rendering the hose more flexible than it would otherwise be.

In other words, the hose of the present invention consists of a spirally wound cylindrically coiled reinforcing element in which the reinforcing element is sheathed within a thermoplastic covering, the sheathed reinforcing element being embedded in a tube wall of thermoplastic material in which the sheath is bonded to the tube wall, but the wire has freedom of movement relative to the sheath and to the tube wall so as to render the hose more flexible than in prior constructions.

According to the present invention, a wire formed of steel, copper, aluminum, or any other suitable material having the proper resiliency, may be sheathed in a thermoplastic covering, by extrusion or otherwise, and thereafter coiled in a cylindrical spiral of substantially the same inside diameter as the hose which is to be made. Alternatively, the wire may be coiled into a cylindrical spiral of the proper inside diameter and the sheath thereafter applied. The important feature of the invention is that the sheath be so applied that the wire will have freedom of movement relative to the sheath.

According to the present invention, the cylindrical coiled spirally wound sheathed reinforcing element is placed on a mandrel or arbor having an outside diameter substantially the same as the inside of the coil and of the hose which is to be formed. A covering of thermoplastic material is then applied in such a manner as to embed the turns of the sheathed wire to connect the adjacent turns thereof to form a hose having a smooth interior and with the sheathed wire forming a spiral corrugation extending the length of the finished hose.

The tube wall may be applied to the cylindrically wound sheathed reinforcing element in a number of different ways. For example, after the coil is applied to the mandrel, the assembly may be dipped in a semiliquid plastic material to thinly coat the turns of the coil and form a connective wall between them. The material is such that it may be thereafter heat treated to take a permanent set. A suitable material is a solution of a polyvinyl chloride in a suitable plasticizer.

According to the disclosed method, the sheathed reinforcing element is placed on a mandrel and the thermoplastic semiliquid material applied by a spraying process which forms an even coating over the coiled reinforcing element and on the mandrel between the turns of the reinforcing element to form the body of the hose wall.

While the hose carcass thus formed is on the mandrel, it is heat treated and cooled so as to take a permanent set to form the completed hose.

The reinforcing element may be so coiled that its turns are spaced apart a suitable distance so as to remain in that position after which the coating is applied to form the tube wall. In that case, the hose would be collapsable lengthwise, but would not be extensible to any appreciable extent except for the stretch of the material between the turns of the coil.

Also, the reinforcing element may be close coiled so that the turns thereof normally tend to move into contact with each other. The coil may then be stretched lengthwise on a mandrel with the turns thereof spaced apart, but under tension tending to return into contact with each other and the coating then applied while the coil is in its stretched position. After the assembly is heat treated and cooled, it is removed from the mandrel.

In that case, the turns of the coil will move toward each other as far as permitted by the tube wall and form a spiral corrugation in the wall between the turns of the coiled reinforcing element. The completed hose will be both extensible and collapsable lengthwise and will be very flexible. The fold in the tube wall between the turns of the coil will merely straighten out when the hose is stretched or flexed and will become deeper when a lengthwise compressive force is applied.

Figure 2:
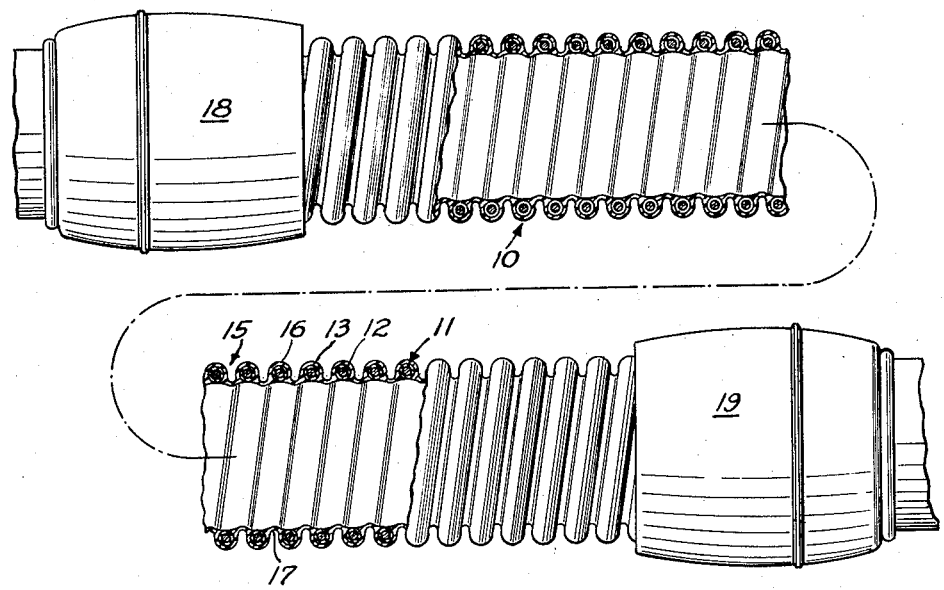

Other objects and advantages of the present invention will become apparent as the description proceeds when taken in connection with the accompanying drawings in which:

Fig. 1 shows the material of the hose wall being applied to the coiled reinforcing element by a spraying process, and Fig. 2 shows the completed hose according to the present invention.

Referring to Fig. 2, the hose of the present invention is generally indicated by the reference numeral 10 and comprises a cylindrical spirally wound reinforcing element 11 in the form of an inner wire 12 sheathed within a covering 13. The coil 11 is embedded within a thermoplastic material of a tube wall generally indicated by the reference numeral 15 which includes a covering or coating 16 for the turns of the reinforcing element 11 and a wall 17 extending between adjacent turns of the coil which forms the body of the hose wall between the turns of the coil 11. It is to be noted that the thickness of the coating 16 over the turns of the coil is substantially the same as the thickness of the wall 17 which extends between the turns of the coil.

Suitable fittings 18, 19 may be applied to the end of the hose 10 whereby one end may be attached to a suction cleaner, and the other to a suitable cleaning tool.

The wall 17 which connects the turns of the coil 11 is in the form of a spiral corrugation which will flatten out when the hose is stretched or flexed.

Fig. 1 shows one method and apparatus by which the hose of the present invention may be made.

The sheath 13 may be extruded about the wire 12 and thereafter coiled into a cylindrically spiral coil as shown. Alternatively, the wire 12 may first be coiled into a cylindrical spiral, and the sheath 13 thereafter applied in a manner well known in the art. It is to be noted that the wire 12 is not bonded to the sheath 13 and has freedom of movement relative thereto.

The sheathed cylindrically coiled reinforcing element 11 is then applied to a mandrel or arbor 20 mounted for rotation in a machine generally indicated by the reference numeral 21. The machine 21 includes a screw 22 which advances a spray head 23 as the arbor 20 is rotated. The spray head 23 includes a spray nozzle 24 by which a suitable semiliquid thermoplastic material is sprayed over the coiled reinforcing element 11 and over the outer surface of the mandrel or arbor 20. As the mandrel 20 and coil 11 is rotated, the spray head 23 advances and deposits an even coating 16 over the turns of the coil 11 and the connecting wall 17 which forms a spiral corrugation between the turns of the coil 11.

After the spray coating 16, 17 is formed, the mandrel 20 and the carcass 25 are removed from the machine 21, heat treated and cooled to fix the coating 16, 17 in the position shown in Fig. 1 after which the completed hose may be removed from the mandrel 20 in any suitable manner.

In the modification shown, the turns of the coil 11 are spaced farther apart on the mandrel than in the natural position shown in Fig. 2. The coil 11 may be prewound with the turns in contact with each other and stretched lengthwise as it is placed on mandrel 20, or it may be prewound so that its turns are closer together than in the position shown in Fig. 1. In either case, the turns of the coil 11 will tend to move toward each other when free to do so. As a result, when the hose 10 is removed from the mandrel, the coil 11 will contract lengthwise, and the wall 17 which connects the adjacent turns of the reinforcing element 11 will move inwardly as shown in Fig. 2 and form a spiral corrugation extending the length of the hose. The hose thus formed is extensible lengthwise, it is contractible lengthwise, and is very flexible, since when flexed the walls 11 between the turns of the reinforcing element 11 merely straighten out on the outside of the bend and move inwardly into a deeper fold on the inside of the bend. When the hose is stretched lengthwise, the walls 17 straighten out, and when it is collapsed lengthwise, the walls 17 merely form deeper folds.

It is within the purview of this invention that the coil 11 be wound in such a manner that its turns are normally spaced from each other and a coating applied with the turns in that position. In that case, the finished hose will be flexible and collapsable lengthwise, but will not be extensible to any appreciable extent except by stretching the material between the turns of the coil.

While I have shown and described but a single embodiment of my invention, it is to be understood that that embodiment is to be taken as illustrative only and not in a limiting sense. I do not wish to be limited to the particular structure and method shown and described, but wish to include all equivalent variations thereof except as limited by the scope of the claims.

I claim:

1. A flexible, extensible and contractable hose consisting of a cylindrical coiled reinforcing element in the form of a coil of wire having spaced turns and encased in a sheath of thermoplastic material; the turns of said coil having freedom of movement relative to said sheath; and a sprayed coating of thermoplastic material bonded to the turns of said coil and forming an impervious wall connecting them and integrally united with the coating over the turns of said coil; said coil being prestressed so that the turns thereof tend to move toward each other when free to do so and being held separated by the impervious wall of thermoplastic material between them; said wall being in the form of an inwardly extending spiral corrugation between the turns of said coil and being held in that position by the tendency of the turns of said coil to move toward each other when the hose is in its natural state of repose; said hose being extensible from its natural state of repose by straightening out the material of said wall which forms said corrugation and being contractable from its natural state of repose by bringing the turns of said coil closer together to compress the wall connecting said turns so as to form a deeper inwardly extending spiral corrugation.

2. The method of forming a flexible, extensible and contactable hose comprising; encasing a cylindrical coil of wire in a sheath of thermoplastic material so that the turns of said coil have freedom of movement within said sheath; placing said sheathed coil on a mandrel with the turns thereof spaced apart so as to tend to move toward each other when free to do so; spraying a coating of semi-liquid thermoplastic material over said sheathed coil and mandrel so as to coat said sheath and form an integral impervious wall between the turns of said coil; treating the carcass thus formed to fuse said coating to said sheath; cooling said carcass to set said semi-liquid material and give it a permanent set and removing said carcass from said mandrel to permit the turns of said coil to move toward each other as far as permitted by said wall and compress said wall into an inwardly extending spiral corrugation lying between the turns of said coil.

References Cited in the file of this patent

UNITED STATES PATENTS

| | | |
|---|---|---|
| 2,321,064 | Broedling | June 8, 1943 |
| 2,475,389 | Hersey | July 5, 1949 |
| 2,513,106 | Prendergast | June 27, 1950 |
| 2,641,303 | Vance | June 9, 1953 |
| 2,782,803 | Rothermel et al. | Feb. 26, 1957 |